(12) United States Patent
Trinh

(10) Patent No.: US 12,074,496 B2
(45) Date of Patent: Aug. 27, 2024

(54) SHAFT ARRANGEMENT FOR A VEHICLE

(71) Applicant: Ningbo Geely Automobile Research & Development Co., Ltd., Ningbo (CN)

(72) Inventor: Freddy Trinh, Gothenburg (SE)

(73) Assignee: Ningbo Geely Automobile Research &Dev. Co., Ltd., Ningbo (CN)

( * ) Notice: Subject to any disclaimer, the term of this patent is extended or adjusted under 35 U.S.C. 154(b) by 363 days.

(21) Appl. No.: 17/503,296

(22) Filed: Oct. 16, 2021

(65) Prior Publication Data
US 2022/0037956 A1 Feb. 3, 2022

Related U.S. Application Data

(63) Continuation of application No. PCT/CN2020/084598, filed on Apr. 14, 2020.

(30) Foreign Application Priority Data

Apr. 23, 2019 (EP) .................................... 19170717

(51) Int. Cl.
*H02K 5/20* (2006.01)
*B60K 11/00* (2006.01)
*G01P 3/487* (2006.01)
*H02K 7/00* (2006.01)
*H02K 9/197* (2006.01)
(Continued)

(52) U.S. Cl.
CPC .............. *H02K 5/203* (2021.01); *B60K 11/00* (2013.01); *G01P 3/487* (2013.01); *H02K 7/003* (2013.01); *H02K 9/197* (2013.01); *H02K 11/215* (2016.01)

(58) Field of Classification Search
CPC .......... H02K 9/197; H02K 9/19; H02K 7/003; H02K 11/21; H02K 11/215; H02K 5/203; B60K 11/00; B60K 11/02; F16H 57/043
USPC ............................................................ 310/54
See application file for complete search history.

(56) References Cited

U.S. PATENT DOCUMENTS 6,469,502 B2 * 10/2002 Fischer .................. G01D 5/145
324/207.2
6,714,005 B2 * 3/2004 Kimura .................. G01D 5/145
324/207.2
(Continued)

FOREIGN PATENT DOCUMENTS

CN 101166917 A 4/2008
CN 201087935 Y 7/2008
(Continued)

OTHER PUBLICATIONS

International Search Report from corresponding International Application No. PCT/CN2020/084598, dated Jul. 20, 2020, 2 pages.

*Primary Examiner* — Burton S Mullins
(74) *Attorney, Agent, or Firm* — Tucker Ellis LLP

(57) ABSTRACT

A shaft arrangement for a vehicle. The shaft arrangement includes a shaft having a fluid channel extending along an axial direction of the shaft. The shaft includes at least one fluid inlet arranged at an axial distance from a first end of the shaft and extends radially between an outside surface of the shaft and the fluid channel. The shaft arrangement further has a sensor including a first sensor part and a second sensor part, wherein the first sensor part is attached to a first end part of the shaft at the first end of the shaft and the second sensor part is arranged to be attached to a first shaft housing part.

18 Claims, 7 Drawing Sheets

(51) Int. Cl.
*H02K 11/21* (2016.01)
*H02K 11/215* (2016.01)

(56) References Cited

U.S. PATENT DOCUMENTS

| | | | |
|---|---|---|---|
| 8,896,166 B2* | 11/2014 | Hofkirchner | H02K 11/33 |
| | | | 310/59 |
| 9,062,988 B2* | 6/2015 | Steinich | G01D 5/145 |
| 9,762,106 B2* | 9/2017 | Gauthier | H02K 1/32 |
| 2007/0273228 A1 | 11/2007 | Tanaka | |
| 2012/0305226 A1* | 12/2012 | Chamberlin | H02K 9/19 |
| | | | 29/890.03 |
| 2013/0270939 A1 | 10/2013 | Brandl | |
| 2016/0061637 A1* | 3/2016 | Aichriedler | G01D 11/24 |
| | | | 324/207.12 |
| 2016/0164378 A1 | 6/2016 | Gauthier | |
| 2016/0245674 A1* | 8/2016 | Ausserlechner | G01D 11/24 |
| 2017/0284836 A1 | 10/2017 | Aichriedler | |
| 2020/0282828 A1* | 9/2020 | Suyama | B60L 15/2036 |
| 2021/0402867 A1* | 12/2021 | Kato | B60K 6/40 |

FOREIGN PATENT DOCUMENTS

| | | |
|---|---|---|
| CN | 102159843 A | 8/2011 |
| CN | 104339229 A | 2/2015 |
| CN | 107002770 A | 8/2017 |
| DE | 102009029716 A1 | 12/2009 |
| WO | 2013060548 A1 | 5/2013 |

* cited by examiner

SHAFT ARRANGEMENT FOR A VEHICLE

RELATED APPLICATION DATA

This application is a continuation of International Patent Application No. PCT/CN2020/084598, filed Apr. 14, 2020, which claims the benefit of European Patent Application No. 19170717.3, filed Apr. 23, 2019, the disclosures of which are incorporated herein by reference in their entireties.

TECHNICAL FIELD

The invention relates to a shaft arrangement for a vehicle, wherein the shaft arrangement comprises a shaft comprising a fluid channel extending along an axial direction of the shaft.

BACKGROUND

In vehicle's, a number of shafts are used to provide rotary motion. US 2007/0273228A discloses a rotor shaft for an electric motor. The rotor shaft is arranged in a casing and has an axial hollow bore formed through the shaft for transport of lubricating oil to a pair of bearings supporting the rotor shaft.

It is often preferable to measure the rotational speed of the shaft. One common way of measuring the rotational speed of a shaft is to use a resolver. A rotor part of the resolver is attached to the shaft while a stator part encircles the rotor part. A resolver allows for fluid to pass through a shaft as the rotor is attached to the outside of the shaft. This allows for fluid transport through a shaft where needed.

A resolver would be suitable to measure the rotational speed of a shaft according to US 2007/0273228 A. However, a resolver is costly to install and will increase the inertia on the part of the shaft where the resolver is installed by the added mass of the rotor. The resolver is also sensitive to radial movement of the shaft, as this movement causes inaccurate speed readings.

SUMMARY

An objective of the disclosure is to provide an improved shaft arrangement inside which a fluid can be transported. The objective is achieved by a shaft arrangement for a vehicle. The shaft arrangement comprises a shaft comprising a fluid channel extending along an axial direction of the shaft. The shaft comprises at least one fluid inlet arranged at an axial distance from a first end of the shaft and extending radially between an outside surface of the shaft and the fluid channel. The shaft arrangement further comprises a sensor comprising a first sensor part and a second sensor part, wherein the first sensor part is attached to a first end part of the shaft at the first end of the shaft and the second sensor part is arranged to be attached to a shaft housing.

By providing a shaft arrangement according to the disclosure, a shaft provided with a sensor attached to first end part of the shaft and fluid inlets allows for a measurement of the rotational speed of the shaft that is less sensitive to radial movement of the shaft while still providing sufficient transport of fluid into the fluid channel of the shaft.

According to an embodiment, the shaft arrangement is arranged to be supplied a fluid from an external fluid supply via a fluid supply channel arranged such that the fluid flows past the first sensor part, from the outside of the shaft through the fluid inlets into the fluid channel.

The fluid may be supplied from an external fluid supply. In order to take advantage of that sufficient transport of fluid can take place into the fluid channel of the shaft, a fluid supply channel is arranged to provide fluid in a way that enables the fluid to enter the fluid channel even though it may be blocked at the first end part by the first sensor part. This is achieved by arranging the fluid supply channel such that the fluid can flow past the first sensor part and into the fluid channel by means of the fluid inlets arranged at an axial distance from a first end of the shaft. If the first sensor part does not completely block the first end part, the fluid may pass through the first end part past the first sensor part into the fluid channel as well as through the inlets.

According to an embodiment, the shaft comprises at least one fluid outlet arranged at an axial distance from the at least one fluid inlet, wherein the at least one fluid outlet extends radially between the fluid channel and the outside surface of the shaft.

The shaft arrangement allows for the fluid inside the fluid channel of the shaft to be transported to a fluid outlet arranged on the shaft, at an axial distance from the fluid inlet. This allows for fluid to be used for lubrication and/or cooling to various parts of the vehicle.

According to an embodiment, the at least one fluid outlet arranged at an axial distance is arranged at an opposite side of the first end of the shaft.

By arranging the fluid outlet at an opposite side of the first end shaft, the shaft allows fluid to be transported the entire length of the shaft before it exits the shaft. This can allow fluid to be transported through the shaft to a part of the vehicle that could otherwise be difficult to reach. This can also allow redundancy or alternative fluid paths for various fluids.

According to an embodiment, the fluid channel and the at least one fluid inlet is adapted to be connected to an existing cooling system of a vehicle to transport cooling fluid.

The use of an existing cooling system to provide cooling fluid to the shaft for further cooling fluid transport ensures a cost effective use of existing system. The cooling system can for instance be the air conditioning cooling system, the battery pack cooling system or the transmission fluid cooling system.

According to an embodiment, the first sensor part is attached to an inside wall of the fluid channel.

Having the first sensor part attached to the inside wall of the fluid channel reduces the inertia provided by the first sensor part to the shaft as there are no parts of the sensor that extends outwardly from the shaft, thereby making the shaft more rotationally stable than if it would have been provided with a rotor part of a resolver.

According to an embodiment, the fluid channel is open axially at the first end of the shaft and wherein the second sensor part is adapted to extend into the fluid channel at the first end of the shaft.

Having the second sensor part extending into the fluid channel at the first end of the shaft provides a sensor that is insensitive to radial movement in the shaft. Preferably but not necessarily, the second sensor part is centered in the shaft.

According to an embodiment, the part of the second sensor part that extends into the fluid channel at the first end of the shaft comprises an inner second sensor part that has a smaller cross sectional area than an outer second sensor part.

This allows for a more efficiently flow of fluid past the inner second sensor part.

According to an embodiment, the second sensor comprises a stepped transition between the inner second sensor part and the outer second sensor part, or a gradually decreasing cross sectional area, e.g. a chamfered transition or a curved transition.

These varying transitions can be utilized depending on the desired flow past the second sensor into the fluid channel.

According to an embodiment, the sensor is a magnetoresistant sensor, e.g. an anisotropic magnetoresistant sensor, a giant magnetoresistant sensor, a tunnel magnetoresistant sensor or an extraordinary magnetoresistant sensor.

These kinds of sensors provide the desired characteristics for a sensor that measures the rotational speed of a shaft and can be positioned according to the disclosure.

According to an embodiment, the first sensor part is a ring-shaped Halbach array, e.g. a Halbach cylinder, and the second sensor part is arranged to detect changes in the magnetic field inside the first sensor part due to a rotational motion of the shaft.

According to an embodiment, at least one of the at least one fluid inlet extends in a direction perpendicular to the axial direction of the shaft.

This provides for a cost effective manufacturing of the shaft.

According to an embodiment, at least one of the at least one fluid inlet extends at an angle to the axial direction of the shaft.

Having at least one fluid inlet arranged at an angle to the axial direction can provide a pumping effect when the shaft rotates, thereby providing increased fluid flow into the fluid channel. If the fluid is a cooling fluid, this increases the cooling effect.

A further objective of the disclosure is to provide an electric motor system comprising an electric motor and a shaft arrangement according to any one of the preceding claims, wherein the at least one fluid outlet is arranged to provide cooling fluid to a rotor of the electric motor.

When an electric motor provides high power/high torque the temperature of the motor increases. In order to control the temperature of the electric motor the shaft to which the rotor is attached can be provided with a shaft arrangement as described above that transports cooling fluid to the electric motor. This allows for efficient cooling of the electric motor and increases the life span of the motor even though it provides high torque.

A further objective of the disclosure is to provide a vehicle comprising a shaft arrangement according to the above description.

DETAILED DESCRIPTION

Figure 1:
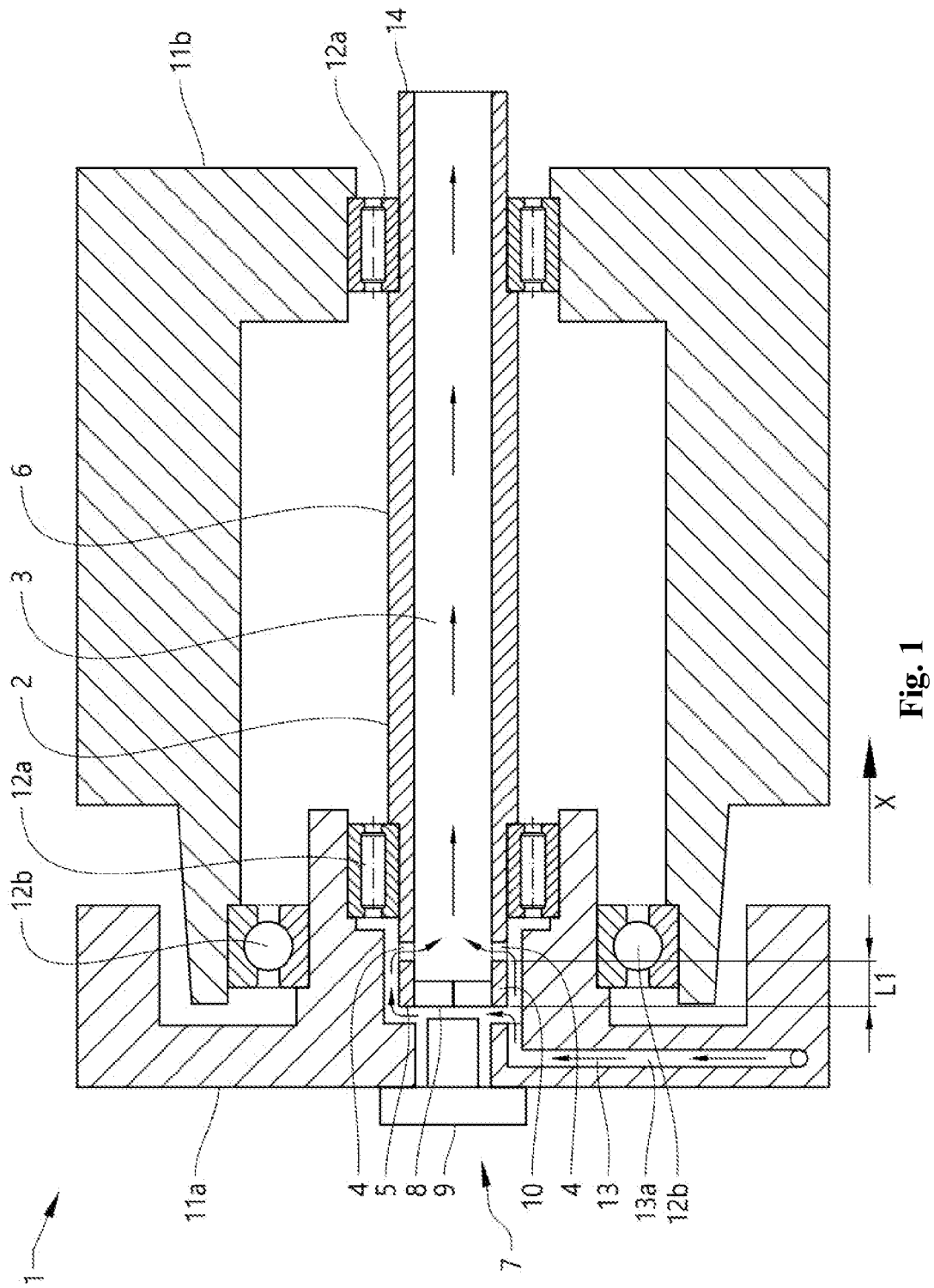
FIG. 1 schematically shows a shaft arrangement according to a first example embodiment, FIG. 2 schematically shows a shaft arrangement according to a second example embodiment, FIG. 3 schematically shows a shaft arrangement according to a third example embodiment, FIG. 4 schematically shows a shaft arrangement according to a fourth example embodiment, FIG. 5 schematically shows an electric motor system according to an example embodiment, FIGS. 6A-6D schematically show variations of fluid inlet cross sections.

FIG. 1 schematically shows a shaft arrangement 1 according to a first example embodiment. The shaft arrangement 1 is a shaft arrangement for a vehicle. The shaft arrangement 1 comprises a shaft 2 comprising a fluid channel 3 extending along an axial direction X of the shaft 2. The shaft 2 comprises in this example two fluid inlets 4 arranged at a first axial distance L1 from a first end 5 of the shaft 2 and extending radially between an outside surface 6 of the shaft 2 and the fluid channel 3. The first axial distance L1 in this example is measured from the first end 5 to the part of the fluid inlet 4 closest to the first end part 5. The shaft arrangement 1 further comprises a sensor 7 comprising a first sensor part 8 and a second sensor part 9. The first sensor part 8 is attached to a first end part 10 of the shaft 2 at the first end 5 of the shaft 2 and the second sensor part 9 is arranged to be attached to a first shaft housing part 11a. The shaft 2 is mounted in the first shaft housing part 11a and a second shaft housing part 11b by means of first bearings 12a. The first bearings 12a are arranged such that the shaft 2 can rotate relative the first and second shaft housing parts 11a, 11b. The first shaft housing part 11a and second shaft housing part 11b are for instance parts of an engine block, an electric motor housing or a wheel housing. Second bearings 12b may be arranged between the first shaft housing part 11a and second shaft housing part 11b such that they can rotate relative each other.

Fluid 13 (illustrated by the arrows) is supplied from an external fluid supply (not shown) via a fluid supply channel 13a and is arranged to flow past the first sensor part 8 at the first end 5, thereby passing from the outside of the shaft 2 through the fluid inlets 4 into the fluid channel 3. Thus, the fluid supply channel 13a is fluidly connected to the fluid inlets 4. The fluid 13 can be a cooling fluid and/or a lubricating fluid. The arrows in the figures are intended to illustrate fluid flow paths to and through the shaft arrangement.

In the first example embodiment, the first sensor part 8 is effectively blocking fluid 13 from entering the fluid channel 3. Alternatively, the shaft 2 is closed axially at the first end 5 with the first sensor part 8 embedded in the material of the first end part 10 of the shaft 2. The first sensor part 8 is a magnet comprising at least two pieces having different magnetic field orientations. The second sensor part 9 is arranged to detect changes in the magnetic field of first sensor part 8 due to a rotational motion of the shaft 2.

The fluid channel 3 of the shaft 2 is open axially at a second end 14 opposite the first end 5 of the shaft 2 allowing the fluid 13 to flow through the shaft 2 to the opposite side of the shaft 2 from where the fluid 13 is supplied.

The sensor 7 is a magnetoresistant sensor, e.g. an anisotropic magnetoresistant sensor, a giant magnetoresistant sensor, a tunnel magnetoresistant sensor or an extraordinary magnetoresistant sensor, arranged to measure the rotational speed and position of the shaft 2.

Figure 2:
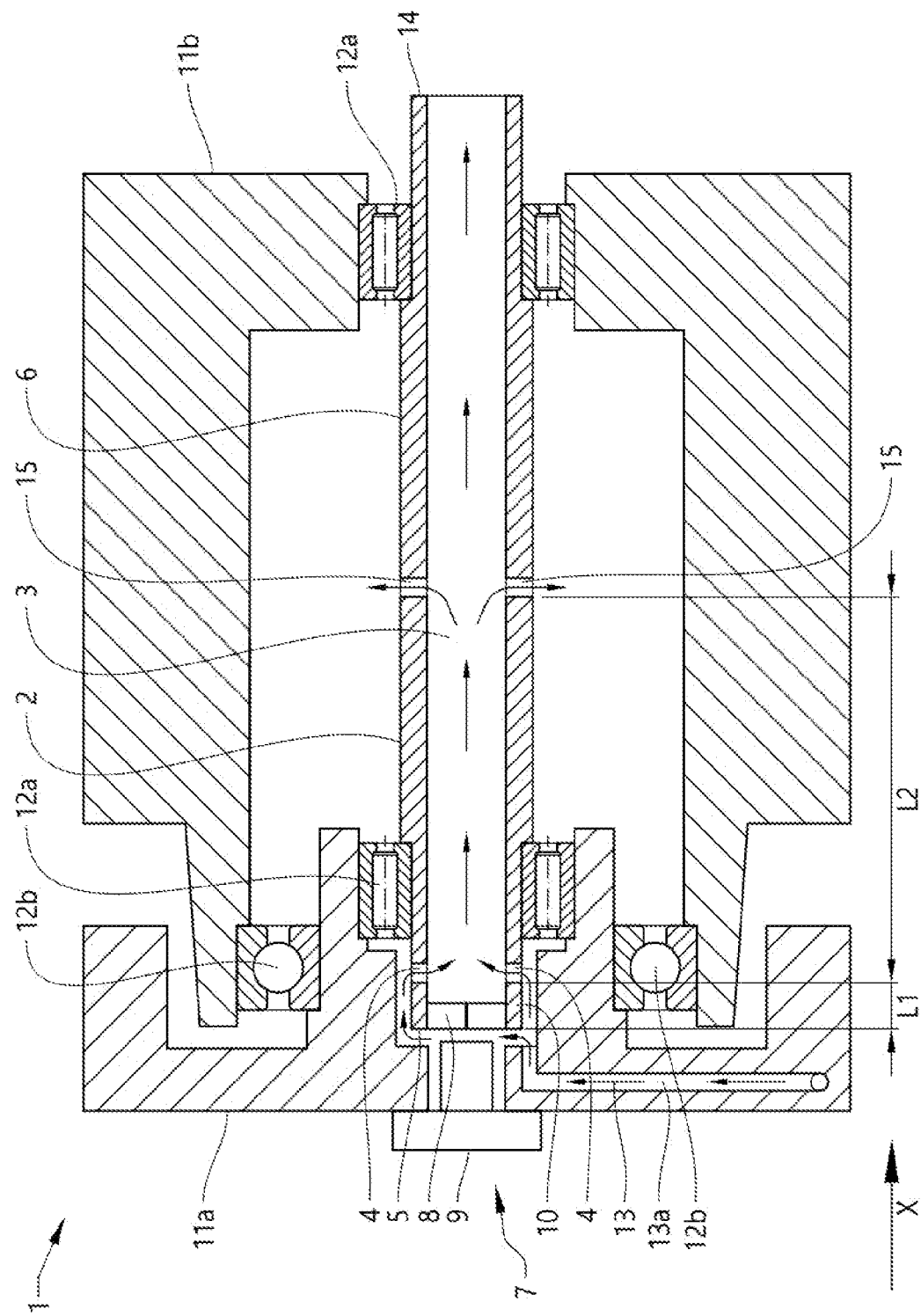

FIG. 2 schematically shows a shaft arrangement 1 according to a second example embodiment. In this embodiment, the shaft 2 comprises two fluid outlets 15 arranged at a second axial distance L2 from the fluid inlets 4. The fluid outlets 15 extend radially between the fluid channel 3 and the outside surface 6 of the shaft 2. In this example, the two fluid outlets 15 are arranged at the same axial distance L2 from the fluid inlets 4. The second axial distance L2 is in this example measured from the first end 5 to the part of the fluid outlet 15 closest to the first end part 5. The fluid outlets 15 can also be arranged at different axial differences from the fluid inlets 4 instead of that both are arranged at the same distance L2 as in this example.

The fluid outlets 15 allow fluid 13 to be used for lubrication and/or cooling to various parts of the vehicle. After the fluid 13 has passed out of the fluid outlets 15, the fluid is returned to a collecting container or sump (not shown) from which the fluid 13 can be recirculated.

Figure 3:
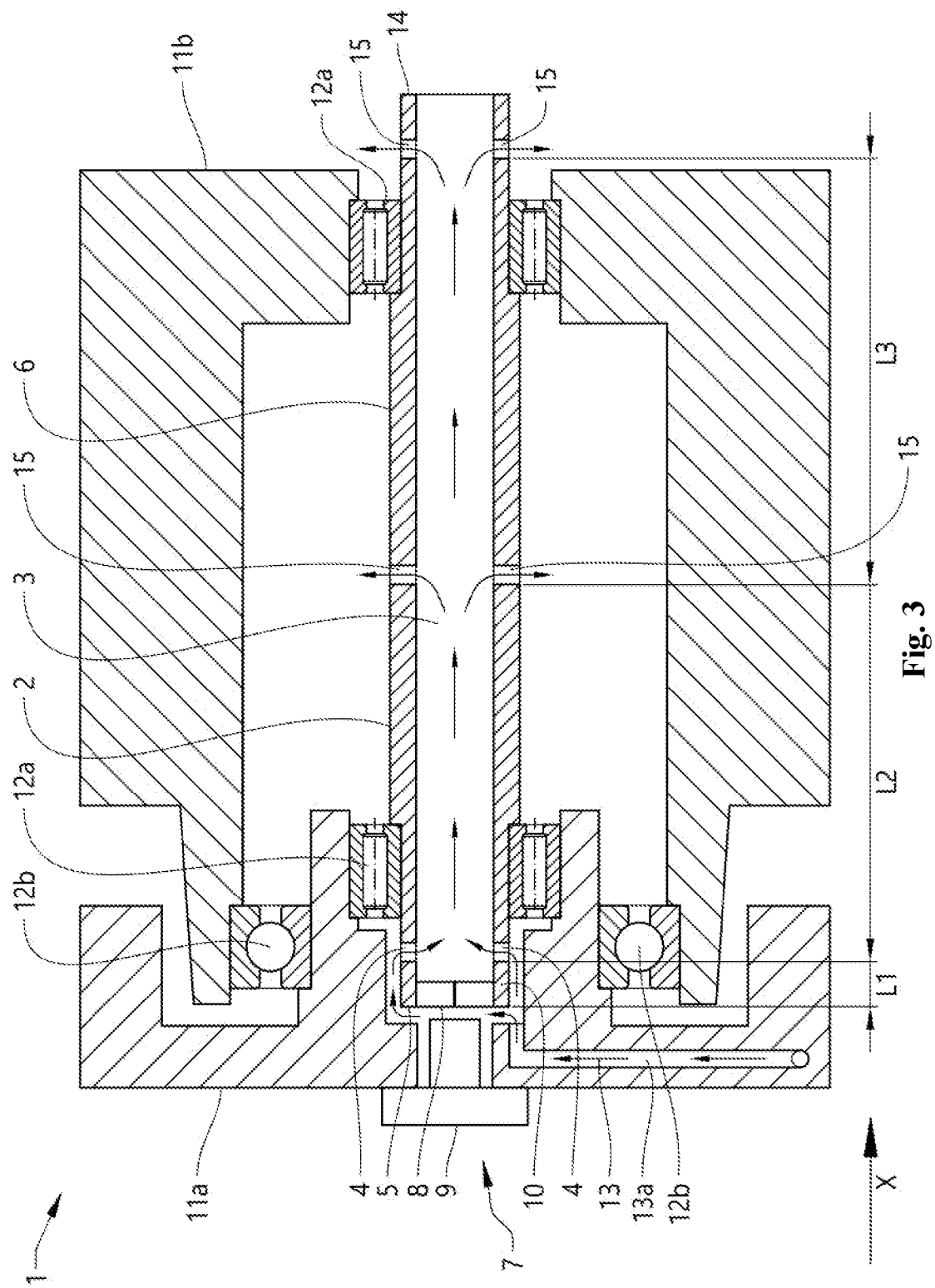

FIG. 3 schematically shows a shaft arrangement 1 according to a third example embodiment. In this embodiment, the fluid outlets 15 are arranged at a third axial distance L3 from the fluid inlets 4 such that they are arranged at an opposite side of the first end 5 of the shaft 2. I.e., the fluid outlets 15 are arranged at the second end 14, at the same axial distance from the second end 14 that the fluid inlets 4 are arranged from the first end 5, when measuring from the second end 14 to the part of the fluid outlets 15 closest to the second end 14.

Figure 4:
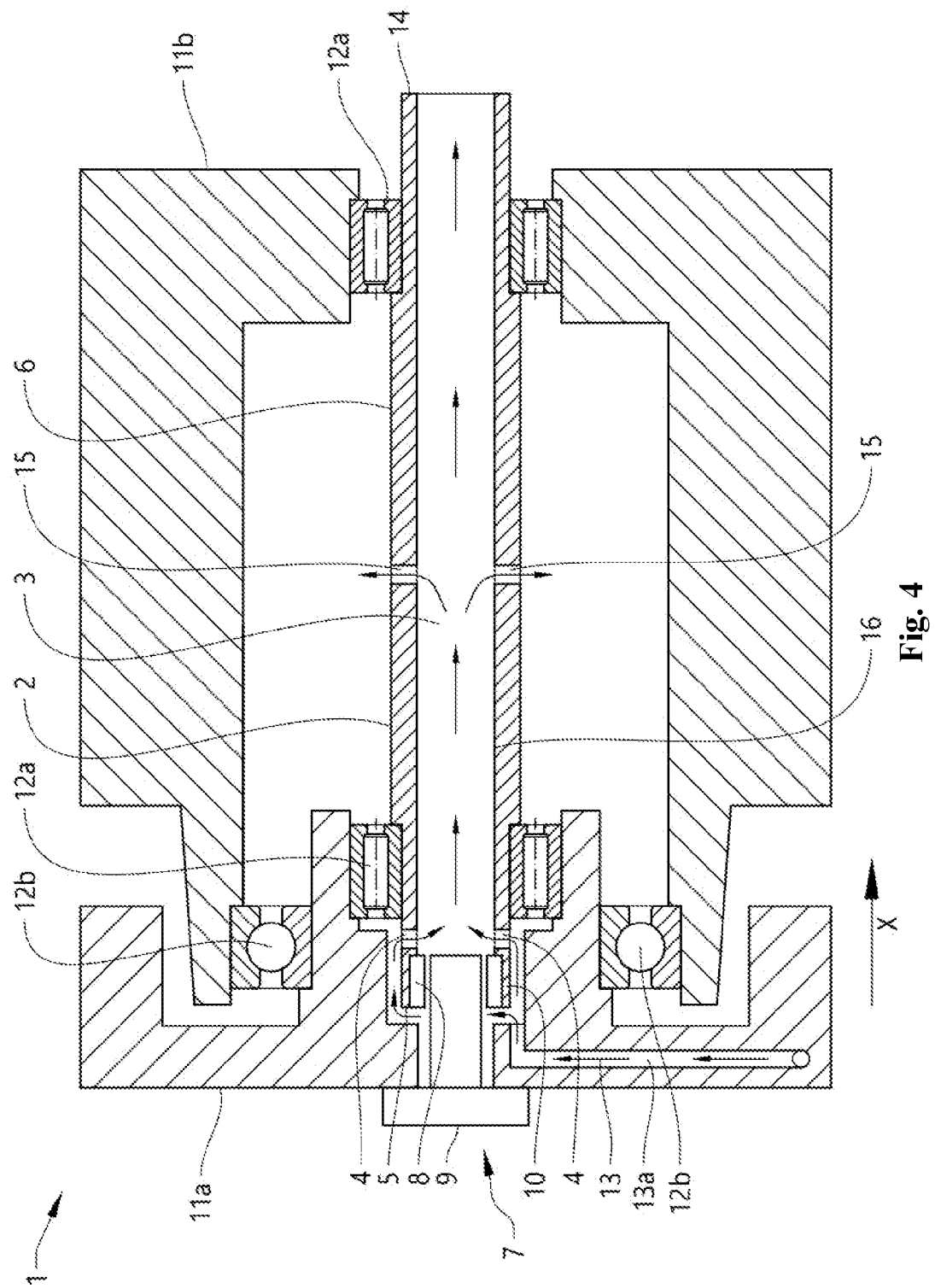

FIG. 4 schematically shows a shaft arrangement 1 according to a fourth example embodiment. In this embodiment, the first sensor part 8 is attached to an inside wall 16 of the fluid channel 3 at the first end 5 of the shaft 2. In order to allow fluid 13 to pass into the fluid channel 3, the fluid channel 3 is open axially at the first end 5 of the shaft 2. The second sensor part 9 is adapted to extend into the fluid channel 3 at the first end 5 of the shaft 2. In this embodiment, fluid can also pass between the first sensor part 8 and the second sensor part 9 apart from passing past the first sensor part 8 through the fluid inlets 4 as described above.

In this embodiment, the first sensor part 8 is a ring-shaped Halbach array, e.g. a Halbach cylinder, and the second sensor part 9 is arranged to detect changes in the magnetic field inside the first sensor part 8 due to a rotational motion of the shaft 2.

Figure 5:
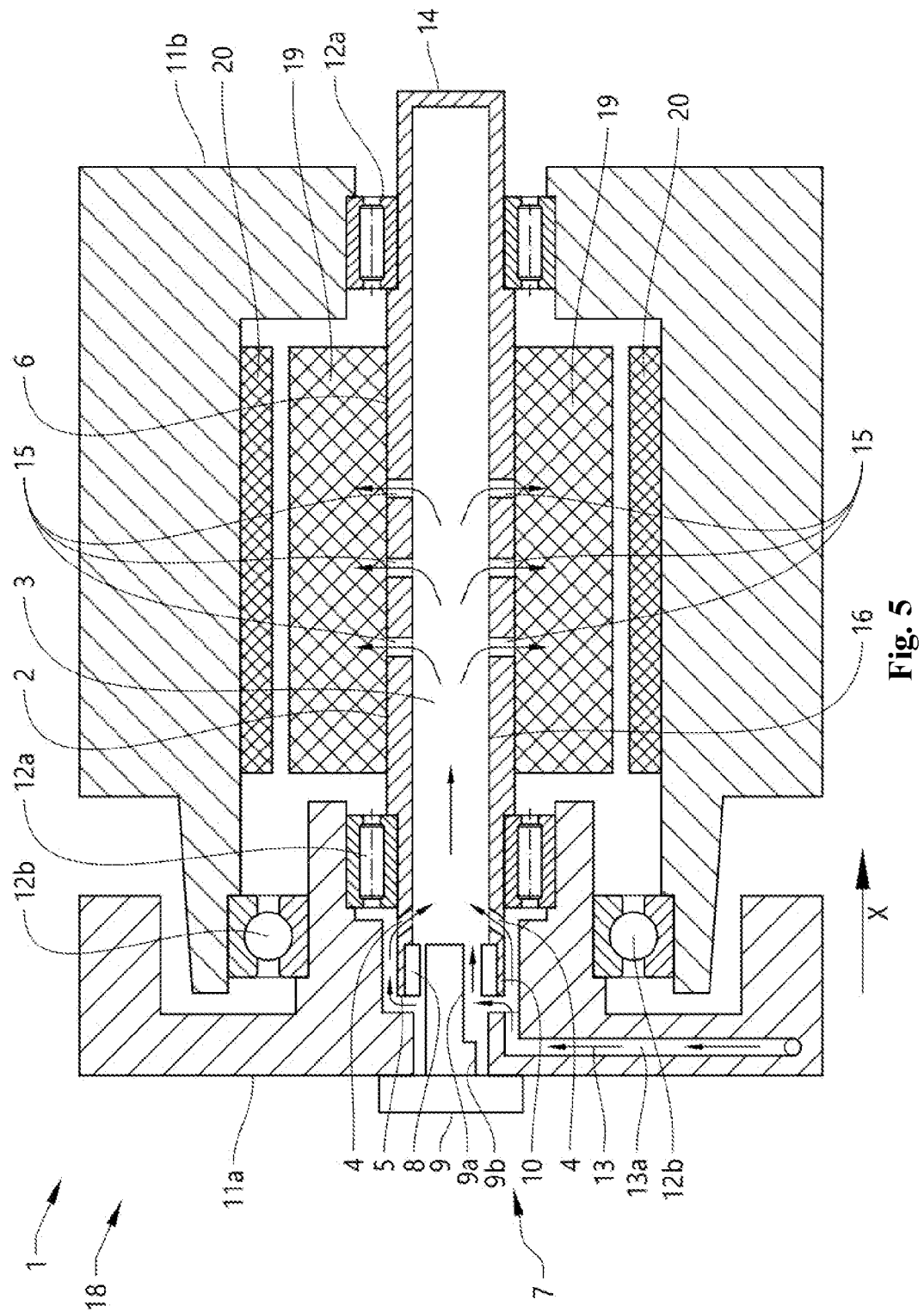

FIG. 5 schematically shows an electric motor system 17 according to an example embodiment. The electric motor system 17 comprises an electric motor 18 and a shaft arrangement 1. The electric motor 18 comprises a rotor 19 attached to the shaft 2 and a stator 20 attached to the second shaft housing part 11b. The fluid outlets 15 of the shaft 2 are arranged to provide cooling fluid to the rotor 19 of the electric motor 18. The cooling fluid is after being distributed over the rotor, returned to the cooling system from where it came by being returned to a collecting container or sump (not shown) from which the cooling fluid can be recirculated. In this embodiment, the fluid channel 3 of the shaft 2 is closed axially at a second end 14 opposite the first end 5 of the shaft 2 allowing all fluid 13 to flow through the fluid outlets 15 to the rotor 19 of the electric motor 18.

As seen in FIG. 1-4, the fluid inlets 4 may have an extension from the outside surface 6 to the fluid channel 3 in a direction perpendicular to the axial direction X of the shaft 2, i.e. in a radial direction. Alternatively, as seen in FIG. 5 at least one fluid inlet 4 extends at an angle to the axial direction X of the shaft 2. By having one or more fluid inlets 4 arranged at an angle to the axial direction X of the shaft 2, a pumping action to increase the flow of fluid 13 through the shaft 2 can be created by the fluid inlets 4 when the shaft 2 rotates.

Also in FIG. 5, the part of the second sensor part 9 that extends into the fluid channel 3 at the first end 5 of the shaft 2 comprises an inner second sensor part 9a that has a smaller cross sectional area than an outer second sensor part 9b. This leads to that fluid 13 can flow more efficiently past the inner second sensor part 9a. In FIG. 5, the second sensor 9 comprises a stepped transition between the inner second sensor part 9a and the outer second sensor part 9b. Other transitions are possible, such as a gradually decreasing cross sectional area, e.g. a chamfered transition or a curved transition. It is also conceivable to have the smaller cross sectional area centered, as opposed to what is shown in FIG. 5, where the inner second sensor part 9a is not centered. The configuration with an inner second sensor part 9a and an outer second sensor part 9b can be used also with the shaft arrangements 1 according to FIGS. 1-4.

Figure 6A:
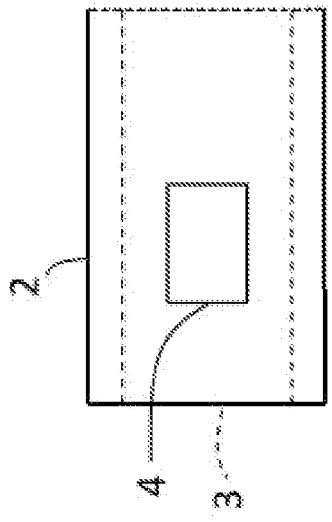
Figure 6B:
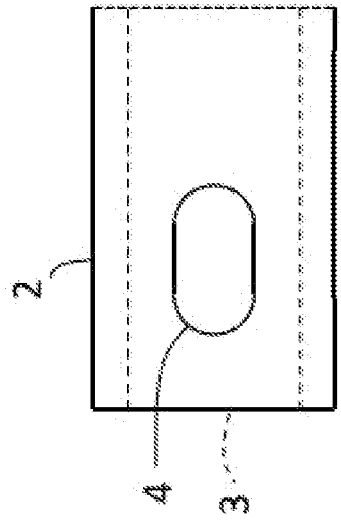
Figure 6C:
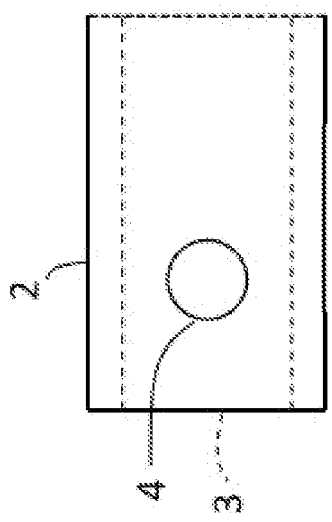
Figure 6D:
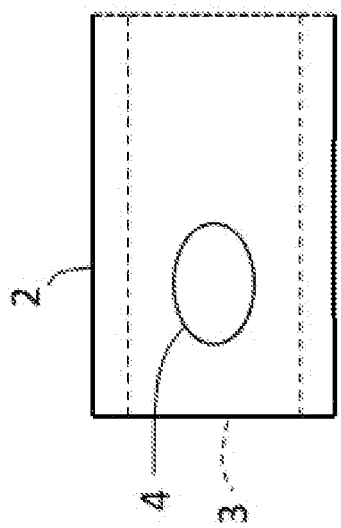

FIG. 6A-6D schematically shows variations of cross sections of fluid inlets 4 on the shaft 2. The placement of the fluid inlet 4 on the shaft 2 is merely for demonstration and is not to be seen as limiting. The fluid inlets 4 can have one or more of a circular cross-section as seen in FIG. 6A, a rectangular cross-section as seen in FIG. 6B, an oval cross-section as seen in FIG. 6C or a stadium cross-section as seen in FIG. 6D. The cross section referred to, is the cross section of the fluid inlet 4 as viewed directly into the fluid inlet 4.

By being able to vary the design of the fluid inlets 4, the amount of fluid 13 that can pass through the fluid inlets 4 can be designed for specific applications. The fluid outlets 15 may also have different cross sections in the same way as the fluid inlets 4 described above. Each of the different cross sections in FIG. 6A-6D can be combined with a fluid inlet 4 or fluid outlet 15 extending perpendicular to the axial direction of the shaft 2 or extending at an angle to the axial direction of the shaft 2.

Figure 7:
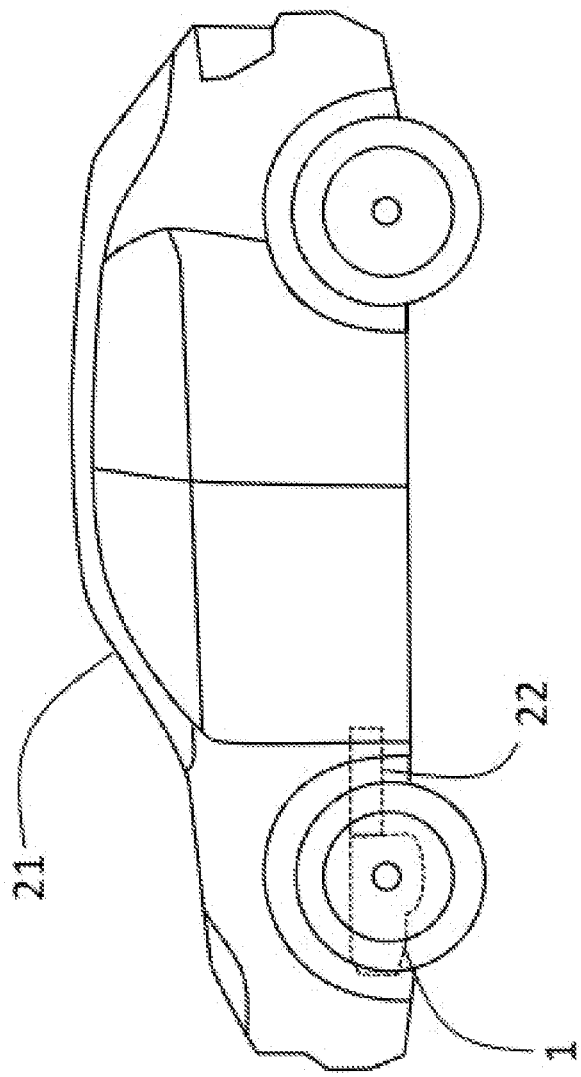
FIG. 7 schematically shows a vehicle comprising a shaft arrangement according to the disclosure.

FIG. 7 schematically shows a vehicle 21 comprising a shaft arrangement 1 according to the disclosure. The fluid channel 3 and the fluid inlets 4 of the shaft arrangement 1 are adapted to be connected to an existing cooling system 22 of the vehicle 1 to transport cooling fluid to the shaft arrangement 1. In this example embodiment, the existing cooling system 22 is the transmission fluid cooling system. A part of the transmission fluid is pumped to a heat exchanger where the transmission fluid is cooled by a cooling fluid such as water or air before passing through the shaft 2. It is possible to have the shaft arrangement 1 connected to other existing cooling systems 22 of the vehicle 21, such as an engine cooling system, a battery cooling system or an air conditioning cooling system, depending on the type of fluid 13 that needs to be passed through the shaft arrangement 1. It is also possible to have a separate cooling system that provides fluid 13 to the shaft arrangement 1.

Although the disclosure has been illustrated and described in detail in the drawings and foregoing description, such illustration and description are to be considered illustrative or exemplary and the disclosure is not limited to the disclosed embodiments. For instance, even though only cooling of an electric motor is illustrated in the disclosure, the invention is also applicable to other shaft arrangements that can be used to cool equipment in a vehicle. The shaft arrangement can also be used for lubrication of various equipments in a vehicle. It is further to be understood from the disclosure that the various fluid inlet and outlet configurations described in the example embodiments above can be used separately or combined, and with any one of the sensor configuration embodiments described.

What is claimed is:

1. A shaft arrangement for a vehicle, wherein the shaft arrangement comprises a shaft comprising a fluid channel within the shaft and extending along an axial direction of the shaft,
    wherein the shaft comprises at least one fluid inlet arranged at an axial distance from a first end of the shaft and extending radially between an outside surface of the shaft and the fluid channel, and
    wherein the shaft arrangement further comprises a sensor comprising a first sensor part and a second sensor part, wherein the first sensor part is attached to a first end part of the shaft at the first end of the shaft, the first sensor part being within the axial distance, and wherein the second sensor part is arranged to be attached to a first shaft housing part, wherein the first sensor part is a magnet comprising at least two pieces having different magnetic field orientations and wherein the second sensor part is arranged to detect changes in the magnetic field of the first sensor part due to rotational motion of the first sensor part with the shaft, and wherein a fluid flow path of the shaft arrangement directs fluid to flow radially outside of the shaft for at least the axial distance so that the fluid flows past the first sensor part outside of the shaft and then travels through the at least one fluid inlet and enters the fluid channel downstream of the first sensor part.

2. The shaft arrangement according to claim 1, wherein the shaft arrangement is arranged to be supplied with the fluid a fluid from an external fluid supply via a fluid supply channel.

3. The shaft arrangement according to claim 1, wherein the shaft comprises at least one fluid outlet arranged at an axial distance from the at least one fluid inlet, wherein the at least one fluid outlet extends radially between the fluid channel and the outside surface of the shaft.

4. The shaft arrangement according to claim 3, wherein the at least one fluid outlet arranged at an axial distance from the at least one fluid inlet is arranged at an opposite end of the shaft to the first end.

5. The shaft arrangement according to claim 1, wherein the fluid channel and the at least one fluid inlet are adapted to be connected to an existing cooling system of a vehicle to transport cooling fluid.

6. The shaft arrangement according to claim 1, wherein the first sensor part is attached to an inside wall of the shaft, the inside wall forming the fluid channel.

7. The shaft arrangement according to claim 1, wherein the fluid channel is open axially at the first end of the shaft and wherein the second sensor part is adapted to extend into the fluid channel at the first end of the shaft.

8. The shaft arrangement according to claim 7, wherein the part of the second sensor part that extends into the fluid channel at the first end of the shaft comprises an inner second sensor part that has a smaller cross sectional area than an outer second sensor part.

9. The shaft arrangement according to claim 8, wherein the second sensor comprises a stepped transition between the inner second sensor part and the outer second sensor part, or gradually decreases in cross sectional area by way of a chamfered transition or a curved transition.

10. The shaft arrangement according to claim 1, wherein the sensor is a magnetoresistant sensor.

11. The shaft arrangement according to claim 10, wherein the first sensor part is a ring-shaped Halbach array and the second sensor part is arranged to detect changes in the magnetic field inside the first sensor part due to a rotational motion of the shaft.

12. The shaft arrangement according to claim 10, wherein the sensor is an anisotropic magnetoresistant sensor, a giant magnetoresistant sensor, a tunnel magnetoresistant sensor, or an extraordinary magnetoresistant sensor.

13. The shaft arrangement according to claim 1, wherein at least one of the at least one fluid inlet extends in a direction perpendicular to the axial direction of the shaft.

14. The shaft arrangement according to claim 1, wherein at least one of the at least one fluid inlet extends at an angle to the axial direction of the shaft.

15. An electric motor system comprising an electric motor and the shaft arrangement according to claim 1, wherein the at least one fluid outlet is arranged to provide cooling fluid to a rotor of the electric motor.

16. A vehicle comprising the shaft arrangement according to claim 1 and a fluid supply from which the fluid is supplied to the shaft arrangement.

17. The shaft arrangement according to claim 1, wherein the fluid is a cooling fluid.

18. The shaft arrangement according to claim 1, wherein the fluid is a lubrication fluid.

* * * * *